July 8, 1952 L. S. WILLIAMS 2,602,659
WEIGHING SCALE
Filed June 11, 1946 3 Sheets-Sheet 1
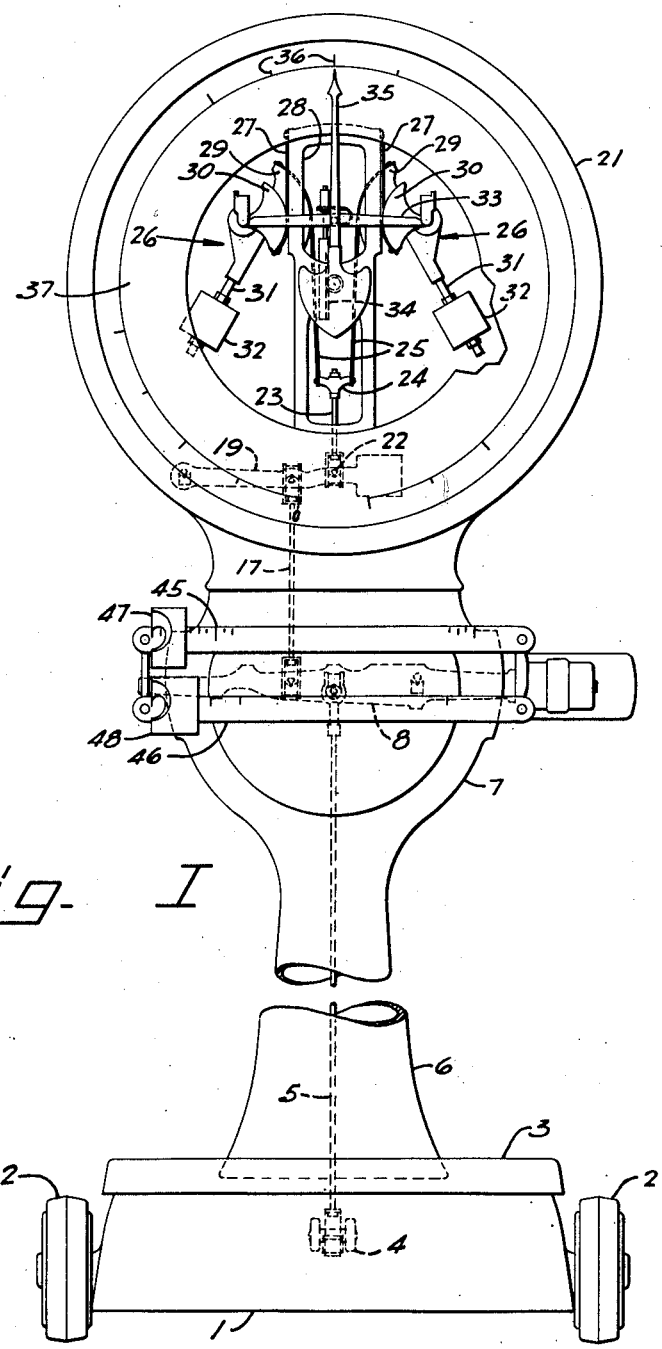
Fig. I
INVENTOR.
Lawrence S. Williams
BY
Marshall and Marshall
ATTORNEYS

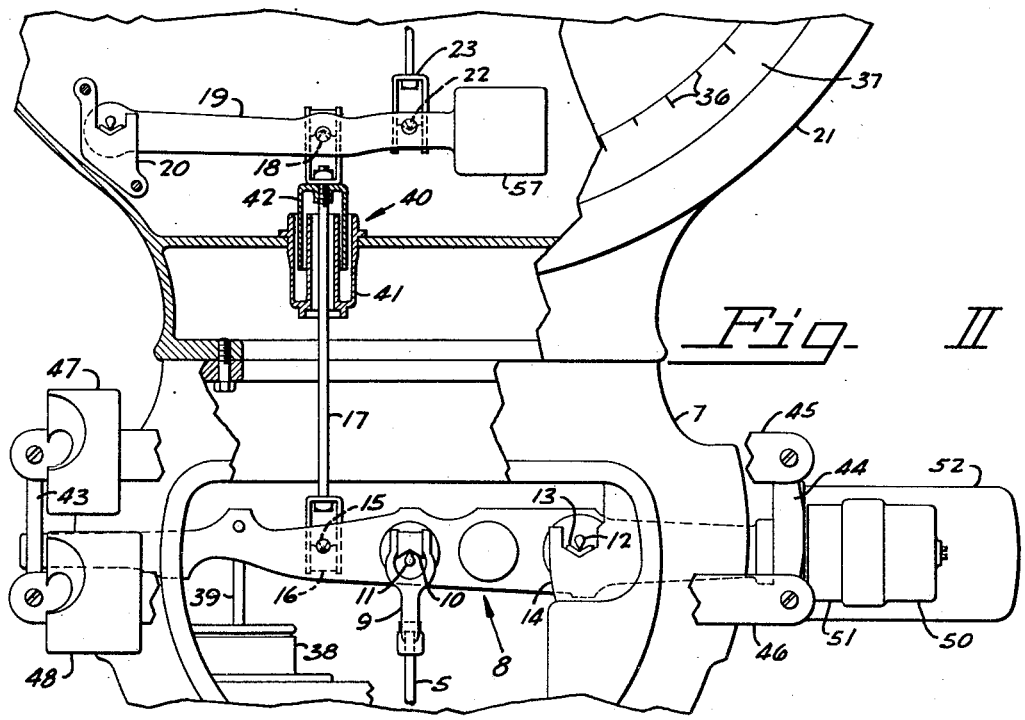
Fig. II
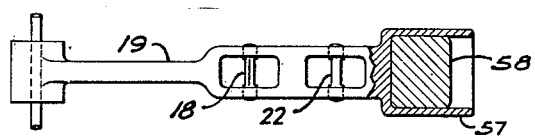
Fig. III
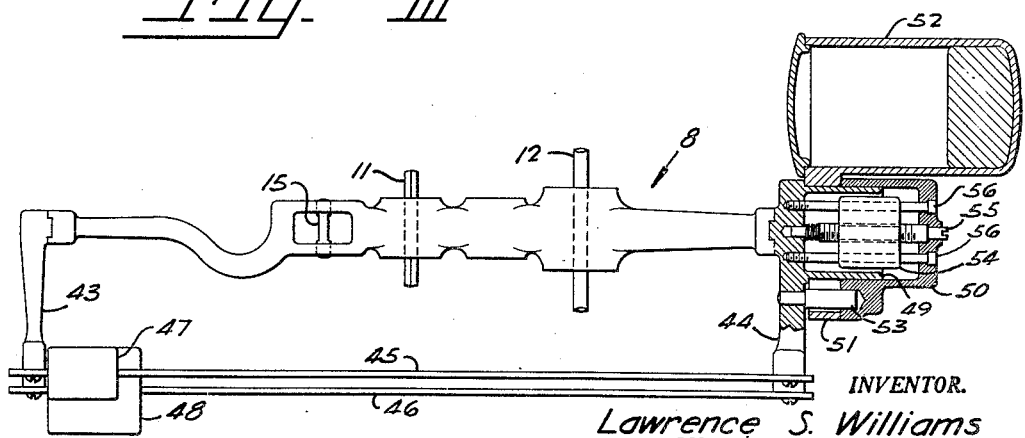
Fig. IV
INVENTOR.
Lawrence S. Williams
BY Marshall and Marshall
ATTORNEYS

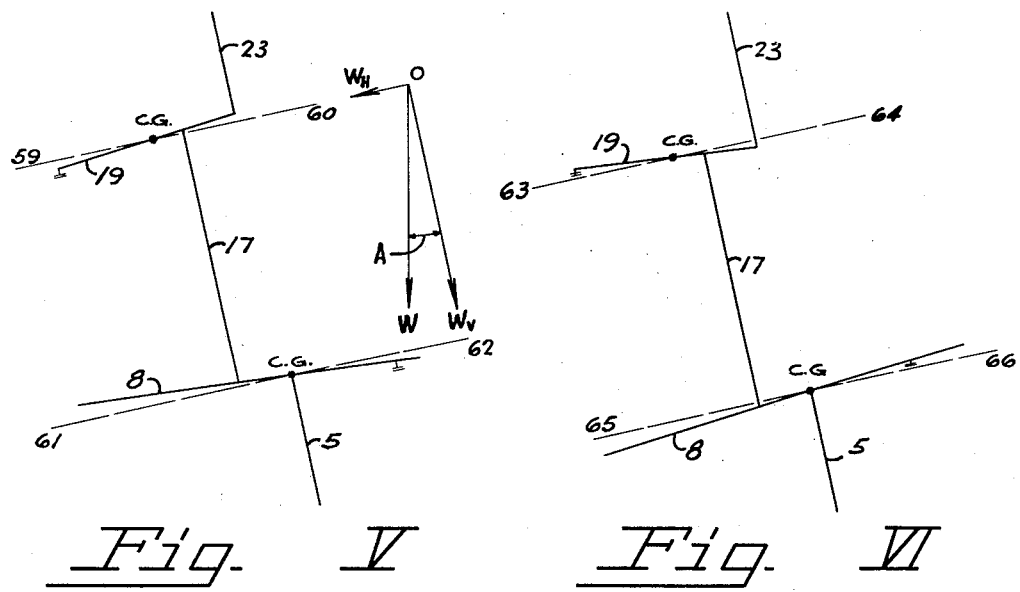
Fig. V    Fig. VI
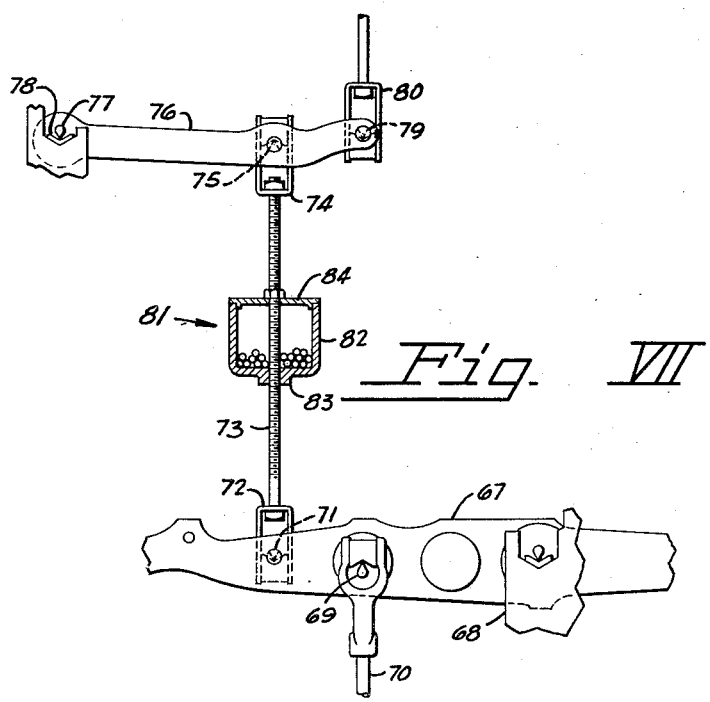
Fig. VII
INVENTOR.
Lawrence S. Williams
BY
Marshall and Marshall
ATTORNEYS Patented July 8, 1952

2,602,659

UNITED STATES PATENT OFFICE 2,602,659

WEIGHING SCALE

Lawrence S. Williams, Toledo, Ohio, assignor to Toledo Scale Company, Toledo, Ohio, a corporation of New Jersey Application June 11, 1946, Serial No. 676,004

5 Claims. (Cl. 265—61)

This invention relates to weighing scales, and in particular to a weighing scale that is constructed so that its indications of load are not affected by an out-of-level condition of the scale.

Many weighing scales, including those employing automatic counterbalancing and indicating mechanisms, are provided with wheels so that they may be easily moved from one location to another. When these scales are moved from place to place, they are used without being precisely level and it is desirable that their indications be correct regardless of their condition of level. When pendulums are used as load counterbalancing elements in portable scales it is customary to use two substantially identical pendulums rotating in opposite directions so that the indication, which is determined by the average of the counterbalancing effects of the two pendulums, shall be unaffected by changes in the condition of level of the scale. It has been found when an intermediate lever system is interposed between a load receiver lever system and a double pendulum counterbalance, that the indications of the scale are still affected by changes in the condition of level of the scale. This tipping error is reduced when the indicator stands at zero by shifting the center of gravity of one of the levers, usually the lever to which the tare beam is attached, in a vertical direction. Thus a portable weighing scale having a double pendulum counterbalance and a tare beam lever whose center of gravity may be moved vertically, may be adjusted to indicate correctly throughout its weighing range when the scale is level and to maintain correct zero load indication as the scale is tipped. However, errors in load indication still appear when the scale is tipped.

The principal object of this invention is to provide a portable weighing scale whose load indications are not affected by an out-of-level condition of the scale.

Another object of the invention is to provide a force transmitting lever system that does not contribute any error to the indication of load when a weighing scale employing the lever system is tipped.

Another object of the invention is to provide means for adjusting the unbalanced moments of each of several force transmitting levers of a force transmitting lever system.

A still further object is to provide initial pull for a counterbalance by applying mass to a member forming the common connection between a pair of levers fulcrumed on opposite sides of the common connection.

These and other objects and advantages are apparent from the following description, in which reference is made to accompanying drawings.

According to the invention the load indications of a portable weighing scale may be made immune to the scale being out-of-level if the resultant of the centers of gravity of the masses constituting the unbalanced weights of the levers moves along a line parallel to the normally vertical center line of the scale. If the levers are fulcrumed on opposite sides of their common connection and are properly proportioned, the change in pull of one lever produced by tipping the scale is counteracted by a corresponding change in pull of another lever, and the indication of the scale is not affected.

An example of a portable weighing scale constructed according to the invention is illustrated in the accompanying drawings.

In the drawings:

Figure I is a front elevation of a portable weighing scale embodying the invention.

Figure II is an enlarged fragmentary portion of the force transmitting lever system of the portable weighing scale.

Figure III is a plan view of one of the levers of the scale.

Figure IV is a plan view partly in section of the other lever of the force transmitting lever system.

Figure V is a diagram of the lever system illustrating the levers in their zero position.

Figure VI is a diagram of the lever system with the levers in their full load position.

Figure VII is a fragmentary elevation of a lever system showing another method of providing initial pull without introducing an error when the scale is placed in an out-of-level condition.

As commonly constructed, a portable weighing scale includes a rigid base 1 that is mounted on wheels 2 so that it may be readily moved from place to place. A load receiver or platform 3, substantially coextensive in area with the base 1, is supported immediately above the base 1 by a lever system contained within the base. The lever system terminates in a nose iron 4 that is located beneath a portion of the base 1 that is not covered by the load receiver 3. The nose iron 4 is pivotally connected to a steelyard rod 5 that extends upwardly through a hollow column 6 erected on the base 1. The upper end of the column 6 is expanded laterally to provide a housing 7 for a tare beam lever 8 whose ends protrude from the sides of the housing 7. The upper end of the steelyard rod 5 is suspended from a stirrup 9 (Figure II) containing V-bearings 10 that rest on a load pivot 11 of the tare beam lever 8. The tare beam lever 8 is supported on a fulcrum pivot 12 that rests on V-bearings 13 of a fulcrum bracket 14 mounted in the housing portion 7 of the column 6.

Forces are transmitted from the tare beam lever 8 through its power pivot 15 that engages a V-bearing 16 mounted in the lower end of a connection 17 suspended from a load pivot 18 of a pendulum lever 19.

The pendulum lever 19 is fulcrumed in a bracket 20 which is mounted within the rim of a substantially watchcase-shaped housing 21 (Figure I) surmounting the housing portion 7 of the column 6. The pendulum lever 19 is connected through its power pivot 22 and a stirrup, bearing and steelyard rod assembly 23 to a yoke 24 that is suspended from power ribbons 25 of a pair of load counterbalancing pendulums 26. The load counterbalancing pendulums 26 are suspended on ribbons 27 that are attached to the upper end of a sector guide 28 mounted vertically within the watchcase-shaped housing 21. The power ribbons 25 and the suspending ribbons 27 overlie power sectors 29 and fulcrum sectors 30 respectively of the pendulums 26, which sectors are proportioned so that the pendulums rotate outwardly and roll upwardly along the sector guide 28 through distances that are proportional to the load forces that are being counterbalanced. Each of the pendulums 26 has a stem 31 on which a weight 32 is mounted. The weight 32 serves to determine the load counterbalancing capacity of the pendulum and its position with respect to the sectors is adjustable in both distance and angle to secure correct operation of the pendulum. The turning centers of the pendulums 26 are interconnected by compensating bars 33, from whose midpoint is suspended a rack 34 that meshes with a pinion on an indicator shaft to drive an indicator 35 through an angle that is proportional to the load or force being counterbalanced. The indicator cooperates with indicia 36 arranged on a chart 37 to indicate the magnitude of the load.

The motion of the moving parts of the counterbalancing mechanism is controlled during changes in load by a hydraulic dashpot 38 (Figure II) whose plunger actuating rod 39 is pivotally connected to the tare beam lever 8.

Since the accuracy of the load counterbalancing mechanism including the pendulums 26 may be affected by accumulations of dust or other foreign material, the watchcase-shaped housing 21 is sealed against the entrance of dust. To prevent the entrance of dust through the opening provided for the interlever connection 17, a liquid seal 40 comprising an annular cup 41 mounted in the housing 21 and an inverted cup 42 mounted on the connection 17 and dipping into the liquid in the annular cup 41 is provided.

The ends of the tare beam lever 8 that protrude through the sides of the housing portion 7 of the column 6, carry forwardly extending brackets 43 and 44 to which a pair of beams 45 and 46 are attached. The upper of these beams, the beam 45, is provided with a tare poise 47 that may be positioned along the beam 45 to offset the weight of a container or initial load placed on the load receiver 3. The lower beam, the beam 46, carries a poise 48 that may be used to offset part of the load on the load receiver 3 and thereby increase the weighing capacity of the scale. The bracket 44 positioned at the fulcrum end of the tare beam lever 8 has a cup-like cylindrical portion 49 extending longitudinally of the lever, the outer surface of which serves to pilot a telescoping cup-like cover 50. A laterally extending arm 51 of a tare beam loading box 52 is also piloted on the cylindrical extension 49 and is clamped between the surface of the bracket 44 and the rim of the cup-like cover 50. A stud 53 set in the bracket 44 outside of the cylindrical extension 49 and parallel thereto, prevents rotation of the cup-like cover 50 and also provides means by which the position of the loading box with respect to the lever may be secured. A balancing weight 54 carried on a threaded screw 55 is positioned within the cup-like extension 49 and is adjustable longitudinally of the lever by rotation of the screw 55. A pair of bolts 56 that pass through holes in the bottom of the cup-like cover 50 pass through slots in the sides of the balance weight 54 and are threaded into the bracket 44 to hold the assembly together and to prevent the balance weight 54 from turning when the screw 55 is rotated.

The pendulum lever 19 (Figure III) is provided with a cup-like loading box 57 on its end adjacent its power pivot 22. The loading box 57 serves as a receptacle for loading material 58 which serves to increase the force with which the pendulum lever pulls against the pendulums.

In the example illustrated the upward pull of the pendulums exerted at the power pivot of the pendulum lever 19 is greater than the downward pull exerted by the weight of the load receiver 3 and the levers supporting it if the unbalance of the pendulum lever 19 and the tare beam lever 8 is eliminated. That is, the weighing scale is constructed so that the initial pull of the pendulum counterbalance exceeds the initial pull of the platform lever system. To balance the scale an initial pull, equal to the difference between the pendulum initial pull and the platform lever system initial pull, is provided by the unbalanced weights of the tare beam lever and the pendulum lever. The common practice has been to provide for this difference in initial pulls by changing the amount of load in the loading box 52 of the tare beam lever 8. When this is done, and the vertical position of the loading box 52 is adjusted with respect to the tare beam lever 8, the scale will indicate correctly throughout its weighing range as long as it is level but it can be made to indicate correctly at only one point of the chart when it is tipped or out-of-level.

According to the invention, the scale may be made to weigh and indicate correctly throughout its weighing capacity if the initial pull provided by the levers is divided between them in the proper proportion. For most complete compensation the initial pull from lever unbalance is divided between the levers in amounts that are generally inversely proportional to the arcs of travel of the weighing levers.

When a weighing scale is tipped, a condition to which portable scales are subjected most of the time to a more or less degree, forces are introduced into the weighing system that may or may not change the indication of load. A portable weighing scale is normally adjusted to weigh and indicate correctly when it is level. Its performance, when it is tipped or out-of-level, may be analyzed by considering that the force of gravity acting on all the parts of the scale and the load is divided into two components at right angles to each other, the first of which, a nearly vertical component, is parallel to the center line of the scale, while the other component, nearly horizontal, is perpendicular or transverse to said center line of the scale. The magnitudes of these components are proportional to the cosine and the sine respectively of the angle through which the scale is tipped from a level position. Inasmuch as the indication of a level scale is the result of balancing the forces of gravity acting on the load, the lever system, and the pendulums, this balance of gravitational forces is not affected by tipping the scale because each of the forces is multiplied by the cosine of the angle of tip, thus varying their actual magnitude but not their condition of balance.

The component of the gravity force acting transverse to the centerline may introduce changes in indication unless its effect on one part of the weighing mechanism is canceled by a counteracting effect on another portion of the system. The pendulums 26 are identical and rotate in opposite directions in counterbalancing load forces. The transversely applied component of gravitational force, however, tends to rotate the pendulums in the same direction in equal amounts which tendencies counteract and balance each other insofar as the indication of load is concerned.

The levers of the scale, in particular the pendulum lever 19 and the tare beam lever 8 (schematically illustrated in Figures V and VI), are subjected to the same transversely directed forces when the scale is tipped. When the levers are in their no load position, the position shown in Figure V, the power pivot end of each lever is above a transverse plane passed through its fulcrum. Figure V schematically illustrates the position of the tare beam lever 8 and the pendulum lever 19, when the indicator of the scale stands at zero and the scale is tipped to the left through an angle A. In the vector diagram, illustrating the lines of action of the forces, the vector O—W represents the force of gravity applied to any part of the scale. The vector O—$W_V$ is the component of the gravity acting along a line parallel to the center line of the tipped scale. The vector O—$W_H$ is the component of the force of gravity acting along a line perpendicular to the center line of the scale. When the scale is level O—$W_H$ is zero and its effect on the lever system is zero.

When the scale is tipped the force represented by the vector O—$W_H$ acts on the centers of gravity of each of the levers and exerts a moment tending to rotate the levers about their fulcrums, which moment is proportional to the weight of the lever and the moment arm of the force. The moment arm of the force is the distance, measured parallel to the center line of the scale, between the fulcrum of the lever and a line passed through the center of gravity of the lever perpendicular to the center line of the scale. Thus, the force acts along the dotted line 59—60 passed through the center of gravity (the point CG) of the pendulum lever 19 and above the fulcrum of the lever 19 so that the lever tends to rotate counterclockwise. Also the force acting along a dotted line 61—62 that passes through the center of gravity of the tare beam lever and above its fulcrum tends to rotate the tare beam lever counterclockwise. The tare beam lever 8 and the pendulum lever 19 rotate in opposite directions when load is applied to the scale. Therefore, the transversely directed force applied to the pendulum lever 19 tends to drive the indicator toward zero, while the similarly directed force applied to the tare beam lever 8 tends to drive the indicator toward the full scale end of the chart.

The centers of gravity for any chance distribution of the weight of the levers may be located so that the effect of the transversely directed force applied to one lever exactly cancels the transversely directed force applied to the other lever for one arbitrarily selected position of the levers. For example, the pendulum lever 19 may be assumed to have negligible mass while the tare beam lever 8 has a comparatively large mass. If the center of gravity of the tare beam lever 8 is on its pivot line to the left of the fulcrum (Figure II) and the scale is tipped to the left, the indicator goes fast at zero. If the center of gravity is dropped beneath the pivot line so as to be on a line that is parallel to the line 61—62 and that passes through the fulcrum of the lever, the moment arm of the transverse force is zero and the zero indication of the scale is not affected by tipping the scale. As soon as load is applied to the scale and the levers take up new positions, the line through the center of gravity of the tare beam lever 8 parallel to the line 61—62 no longer passes through the fulcrum but passes at some distance beneath the fulcrum so that the transverse directed force tends to rotate the tare beam lever clockwise, thereby causing the scale to indicate less load than is actually on the load receiver.

Figure VI illustrates the positions of the levers when the scale is loaded to capacity and is tipped to the left. The transverse force acting on the centers of gravity on the levers tends to rotate the levers clockwise. Clockwise rotation of the pendulum lever 19 causes the scale to indicate fast, while clockwise rotation of the tare beam lever 8 causes the scale to indicate slow. The moments in the two levers resulting from the transversely directed force will cancel each other if the centers of gravity are properly located with respect to lines passed through the fulcrums of the levers. However, if the mass of the levers is not correct the positions of the centers of gravity to secure correct full capacity indication in an out-of-level scale are not the same as those for correct zero indication.

In order that the load indication throughout the weighing range shall be immune to out-of-level conditions of the scale, it is necessary that the moments produced in the levers by the transversely directed component of gravity force shall cancel each other for all positions that the levers may assume. The vertical travel of the center of gravity of the pendulum lever 19, the perpendicular distance between the position of the line 59—60 of Figure V and the corresponding line 63—64 of Figure VI, determines the change in moment produced in the pendulum lever by the transverse force as the scale lever system moves through its weighing range. Likewise, the distance between the positions of the line 61—62 of Figure V and a corresponding line 65—66 of Figure VI represents the change in vertical position of the center of gravity of the tare beam lever as the levers move through their operating range. In order that the moments produced by the transverse force shall cancel each other throughout the entire operating range, it is necessary that the mass of one lever (assumed to be concentrated at its center of gravity) when multiplied by the vertical travel of that center of gravity times the angular travel of the lever shall be equal to the mass concentrated at the center of gravity of the other lever when multiplied by the vertical travel of that center of gravity times the angular travel of the lever. As long as this relation holds it is immaterial whether the centers of gravity be on the pivot lines or whether they are displaced from the pivot lines by proportional amounts. When this relation holds the composite center of gravity of the levers moves along a straight line.

If the mass is proportioned between the levers to satisfy the stated proportionality but the centers of gravity are not properly positioned with respect to the pivot lines of the levers the lever system will exhibit a change in initial pull when it is tipped but the change in initial pull will be substantially independent of the lever positions, i. e. will be of the same magnitude throughout the weighing range. Satisfactory operation is obtained if the centers of gravity are each located on the pivot line of the respective levers or if they are both displaced in the same direction either up or down through distances that are proportional to the vertical travel of the centers of gravity. In this condition of adjustment the composite center of gravity moves along a straight line that is parallel to the center line of the scale.

Initial pull to secure a balance between the initial pulls of the pendulums and the lever system may be provided by adding mass to the connection between the levers. An example of a lever system that does not contribute an error when the scale is tipped, and in which the initial pull may be adjusted by adding weight at a single point, is illustrated in Figure VII. In this example, a tare beam lever 67 carried on a fulcrum bracket 68 has a load pivot 69 to which forces from a load receiver lever system may be applied through a steelyard rod 70. A power pivot 71 of the tare beam lever 67 is connected through a stirrup and bearing 72 to the lower end of a threaded steelyard rod 73 whose upper end is attached to a stirrup and bearing 74 suspended from a load pivot 75 of a pendulum lever 76. The pendulum lever 76 has a fulcrum knife edge 77, resting on a bearing 78 while its power pivot 79 is engaged by a stirrup and bearing 80 suspended from a pair of load counterbalancing pendulums or other automatic counterbalancing mechanism. A loading box 81 mounted on the steelyard rod 73 comprises a cup-shaped body 82 having a drilled and tapped boss 83 formed in its bottom surface and having a removable cover 84.

If the loading box 81 is positioned at the lower end of the steelyard rod 73, its mass has substantially the same effect as if weight were added at the power pivot 71 of the tare beam lever. Therefore, when the scale is tipped to the left, the condition described in connection with Figures V and VI, the scale tends to indicate fast at zero and slow at full load. If the loading box 81 is moved to the top end of the steelyard rod 73 its mass may be considered concentrated at the load pivot 75 of the pendulum lever 76 in which position it produces opposite effects when the scale is tipped. An intermediate position along along the steelyard rod 73 may be found at which the addition of weight to the loading box 81 does not cause a change in the scale indication when the scale is tipped.

Since the initial pull of the scale may be adjusted by adding weight to the loading box 81, and since the distribution of that weight with respect to the levers may be varied by moving the loading box up and down along the steelyard rod 73, it is possible to use the loading box to correct differences in mass distribution between the levers so that the load indications will not be affected by out-of-level conditions of the scale. When the design of the scale housing limits the size of the loading box 81 and, therefore, the amount of mass that may be added at that point the loading box 81 is used to supplement the initial pull provided by unbalancing the pendulum lever and the tare beam lever.

As a matter of convenience and because of the weight of the poises 47 and 48, the loading box for the tare beam lever is located on the opposite side of the fulcrum from its load and power pivots. This loading box is used to decrease the unbalanced mass of the tare beam lever to an amount such that the residual unbalance combined with the unbalanced pull of the pendulum lever provides the desired initial pull at the pendulum. Therefore, to effect a change in mass distribution between the levers without changing the initial pull, it is necessary to add to both or subtract from both loading boxes. If it is desired to change the initial pull without changing the mass distribution, mass must be added to one and subtracted from the other. The advantage of the loading box 81 for securing final adjustments of initial pull is that mass may be added to the loading box and the addition will not affect the balance between the levers insofar as out-of-level weighing is concerned.

If more than two levers are included in the force transmission lever system, the levers may be grouped in pairs in which the levers from each pair are fulcrumed on opposite sides of their common connection. Each pair may then be balanced so that it does not contribute an error when the scale is out-of-level. If an odd number of levers greater than one is used and the levers are fulcrumed some on one side of the scale and some on the other, the odd lever, the one remaining after the others have been paired, may be considered as divided into two component parts, one part of which pairs with one of the other levers and the other part of which pairs with another lever. Thus three levers may be considered as two pairs in which one lever, insofar as out-of-level weighing is concerned, balances the other two.

Various modifications of lever systems may be devised that satisfy the requirement that the resultant center of gravity of the unbalanced masses moves in a line parallel to the vertical center line of the scale.

Having described the invention, I claim:

1. In a portable weighing scale, in combination, a load counterbalancing mechanism, a platform supporting lever system, a force transmission system between the platform lever system and the load counterbalancing mechanism, said force transmission system comprising two groups of levers each containing at least one lever, one group which has its levers fulcrumed to one side of the common connections and the other group to the other side, said levers being proportioned such that the sum of the products of the weight of each lever multiplied by the length of travel of its center of gravity multiplied by the angular travel of the lever for one group is generally equal to the sum of the similar products for the other group.

2. In a portable weighing scale, a pair of levers forming part of a force transmission path, said levers being arranged to rotate in opposite directions with changes in load and being proportioned so that the product of the weight times the travel of the center of gravity times the angular travel of one lever is generally equal to the corresponding product of the other lever.

3. In a portable weighing scale, a pair of levers forming part of a force transmission path, said levers being arranged to rotate in opposite directions with changes in load, said levers having their centers of gravity located on their pivot lines remote from their fulcrum axes and at distances from the fulcrum axes such that the weight of one lever times the vertical travel of its center of gravity times its angular travel equals the corresponding product of the other lever.

4. In a portable weighing scale, levers forming part of a force transmission path from a load receiver supporting system to an automatic counterbalance, a steelyard pivotally connected to and serving to transmit force between a pair of the levers that are fulcrumed at opposite sides of the steelyard, and a loading box mounted on the steelyard with its center of gravity at a point that divides the steelyard into segments that are inversely proportional to the segments of the levers included between the fulcrums and the connections to the steelyard.

5. A lever system according to the claim 4, in which the loading box is adjustably mounted on the steelyard so that its position may be selected to compensate for variations in mass distribution of levers.

LAWRENCE S. WILLIAMS.

REFERENCES CITED

The following references are of record in the file of this patent:

UNITED STATES PATENTS

| Number | Name | Date |
|---|---|---|
| 1,279,835 | Bousfield | Sept. 24, 1918 |
| 1,543,768 | Hem | June 30, 1925 |
| 2,208,555 | Hurt | July 16, 1940 |
| 2,294,819 | Williams | Sept. 1, 1942 |
| 2,368,010 | Eash | Jan. 23, 1945 |

FOREIGN PATENTS

| Number | Country | Date |
|---|---|---|
| 516,172 | Great Britain | Dec. 27, 1939 |